United States Patent Office 2,966,393
Patented Dec. 27, 1960

2,966,393

RECOVERY OF METAL VALUES INCLUDING THORIUM, HAFNIUM, ZIRCONIUM, URANIUM, AND MOLYBDENUM FROM AQUEOUS SOLUTION

Norman Frank Kember, Walton-on-Thames, England, assignor to United Kingdom Atomic Energy Authority No Drawing. Filed Dec. 20, 1956, Ser. No. 629,757

Claims priority, application Great Britain Dec. 22, 1955

8 Claims. (Cl. 23—14.5)

This invention relates to the extraction and/or purification of metals, and is particularly concerned with such extraction or purification involving the employment of adsorption.

The invention is based on the discovery that metallic ions can be adsorbed from aqueous mineral acid solution containing them by contacting the solution with phosphorylated cellulose.

Phosphorylated cellulose is a known material and can be prepared by a number of methods. One method comprises steeping cellulose (cotton or wood pulp, for instance) in an aqueous solution containing 40% by weight of urea and 20% by weight of phosphoric acid, press-drying the phosphorylated product, baking at 130° C. for two hours, washing the baked material with water and drying at 80° C.

According to this invention, an aqueous solution of a concentration at least N/10 with respect to mineral acid, containing a dissolved metal, is brought into contact with phosphorylated cellulose to effect adsorption of the metal.

The adsorbed metal can thereafter be recovered from the phosphorylated cellulose by any appropriate means, for instance, by treatment with an eluant which forms with the adsorbed metal a water-soluble complex salt, or, if desired, by heating the phosphorylated cellulose with a relatively concentrated acid to degrade the cellulose.

The discovery forming the basis of this invention is remarkable in that, by analogy with the behaviour of adsorbents such as cation exchange resins when brought into contact with dissolved metallic ions, one would not expect metal adsorption to occur at high hydrogen ion concentration for this reason: such high acidity would be expected to suppress that preliminary removal of hydrogen from the active centres of the adsorbent which is generally supposed to be essential before the entering metal ions can be accommodated on the adsorbent particles. Yet the method of invention can be, and preferably is, performed at relatively high acid concentrations, preferably at least normal (N) and sometimes 2 N or even higher. (Of course, the acid concentration employed should not be so high that degradation of the phosphorylated cellulose occurs to any appreciable extent.) Moreover, if more than one metal is present in the solution under treatment, the selectiveness of adsorption increases with increase in mineral acid concentration.

A particular use of the method of the invention lies in its application to the extraction of metals from solutions containing appreciable concentrations of phosphate, as, for instance, in Example 1 below. Such solutions are normally very difficult to deal with satisfactorily by usual chemical procedures.

The method of the invention can be performed using the type of apparatus normally employed in chromatographic separation, that is to say, with a column containing the phosphorylated cellulose; and, if desired, the contained adsorbent column can be sectioned after treatment of the metallic solution to isolate that part of it containing the desired adsorbed metal, which is then treated to extract the metal. Alternatively, if the adsorbent column is treated in situ with an eluant which forms a water-soluble complex salt with the adsorbed metal, the adsorbent column can then be washed with water, then with acid and can be re-used.

The invention is illustrated by the following examples.

*Example 1*

An aqueous thorium-containing solution 4 N in sulphuric acid, of the following analysis

|  | Grams per litre |
|---|---|
| $ThO_2$ | 6 |
| $Fe_2O_3$ | 3 |
| $P_2O_5$ | 23 |
| $SO_4''$ | 200 |
| Rare earth oxides | 45 | was passed through a column of phosphorylated cellulose pulp prepared from wood pulp, the column having been previously moistened with dilute (2 N) sulphuric acid. Thorium and iron present were adsorbed on the column. The adsorption of thorium at equilibrium was equivalent to 250 milligrams of $ThO_2$ per gram of the phosphorylated cellulose. Iron was also adsorbed. The column was then washed free from acid with ammonia (5% by weight) solution until the washings were alkaline, and then treated with 2 N aqueous ammonium carbonate solution to elute the thorium as a complex carbonate.

When a quantity of the same solution was first subjected to reduction to convert the ferric salt present to ferrous salt, and then passed through a column of the phosphorylated cellulose, iron was not adsorbed to any appreciable extent. The capacity of the adsorbent for thorium then increased to 330 milligrams $ThO_2$ per gram of adsorbent.

In the treatment of both quantities of solution, only a small amount of the rare earth metals was adsorbed.

*Example 2*

An aqueous N sulphuric acid solution containing uranium and ferrous iron in amounts equivalent to 1 gram $U_3O_8$ and 5 grams FeO respectively per litre was passed through a column of phosphorylated cellulose. Analysis of the column showed the presence of iron (equivalent to 34 milligrams of FeO) and uranium (equivalent to 436 milligrams of $U_3O_8$) per gram of phosphorylated cellulose.

Uranium adsorbed on the phosphorylated cellulose was eluted by means of 2 N aqueous sodium carbonate solution.

*Example 3*

An aqueous solution containing zirconium (in amount equivalent to 2 grams $ZrO_2$ per litre) and associated hafnium impurity (2–3%) in N sulphuric acid was passed through a column of phosphorylated cellulose as described in Example 1. The hafnium and zirconium were adsorbed, and were subsequently eluted by means of 0.2 N amonium fluoride solution.

*Example 4*

In a similar manner a normal aqueous sulphuric acid solution of $MoO_3$ containing 1.5 grams molybdenum per litre was passed through a column of phosphorylated cellulose. The molybdenum was adsorbed, and analysis showed the presence of 78 milligrams of molybdenum per gram of adsorbent.

Copper, magnesium and aluminum in acid solution were found to be only weakly adsorbed on columns of phosphorylated cellulose.

I claim:
1. In the recovery from aqueous solution of a metal selected from the group consisting of thorium, hafnium, zirconium, uranium and molybdenum, a method comprising bringing said aqueous solution, adjusted to a concentration of at least N/10 in respect of mineral acid, into contact with phosphorylated cellulose to effect adsorption of ions of the dissolved metal thereon, and subsequently treating the metal-containing phosphorylated cellulose thus obtained to extract the metal therefrom.

2. A method according to claim 1, in which said aqueous solution is of concentration not less than normal (N) in respect of mineral acid.

3. In the recovery from aqueous solution of a metal selected from the group consisting of thorium, hafnium, zirconium, uranium and molybdenum, a method comprising bringing said aqueous solution, adjusted to a concentration of at least N/10 in respect of mineral acid, into contact with phosphorylated cellulose to effect adsorption of ions of the dissolved metal thereon, and subsequently extracting the adsorbed metal by treating the metal-containing phosphorylated cellulose with an eluant which forms a water-soluble complex salt with the adsorbed metal.

4. In the recovery of thorium from an aqueous acid solution containing it, which is of concentration at least normal in respect of mineral acid, a method which comprises bringing said aqueous solution into contact with phosphorylated cellulose to effect adsorption of thorium ions thereon, and subsequently treating the thorium-containing phosphorylated cellulose thus obtained to extract the thorium therefrom.

5. In the recovery of thorium from an aqueous acid solution containing it, which is of concentration at least normal in respect of sulphuric acid and contains phosphoric acid, a method which comprises passing said aqueous solution through a column of phosphorylated cellulose to effect adsoprtion of thorium ions from the solution, and subsequently treating the thorium-containing phosphorylated cellulose thus obtained to extract the thorium therefrom.

6. A method according to claim 5, in which thorium is extracted from the thorium-containing phosphorylated cellulose obtained, by treatment thereof with an eluant which forms a water-soluble complex salt with the adsorbed thorium.

7. In the recovery of thorium from an aqueous solution thereof which is strongly acid with respect to sulphuric acid and contains dissolved rare earths and phosphoric acid, a method comprising bringing said aqueous acid solution into contact with phosphorylated cellulose to effect preferential adsorption of thorium ions thereon; and subsequently treating the thorium-containing phosphorylated cellulose thus obtained to recover thorium therefrom.

8. In the recovery of thorium from an aqueous solution thereof which is strongly acid with respect to sulphuric acid and contains dissolved rare earths, ferric iron and phosphoric acid, a method comprising reducing the ferric iron in said aqueous acid solution to the ferrous state, bringing the resultant solution into contact with phosphorylated cellulose to effect preferential adsorption of thorium ions thereon; and subsequently treating the thorium-containing phosphorylated cellulose thus obtained to recover thorium therefrom.

References Cited in the file of this patent

FOREIGN PATENTS 654,696     Great Britain _____ June 27, 1951

OTHER REFERENCES

Noble, Jr., et al.; "Development of a Char-in-Pulp Process for the Recovery of Uranium," RMO–2616, October 1954, pages 18–29.